Figure 7:
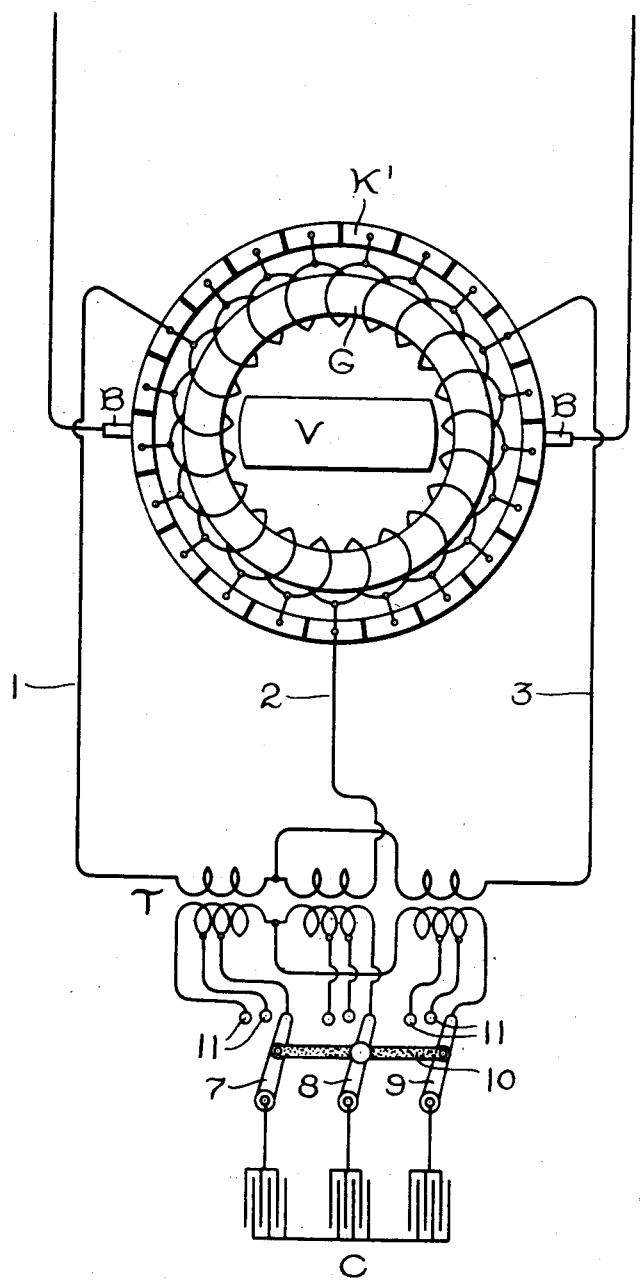

No. 712,041. Patented Oct. 28, 1902.
H. W. BUCK.
EXCITING DYNAMO.
(Application filed Sept. 2, 1898.)
(No Model.) 2 Sheets—Sheet 1.
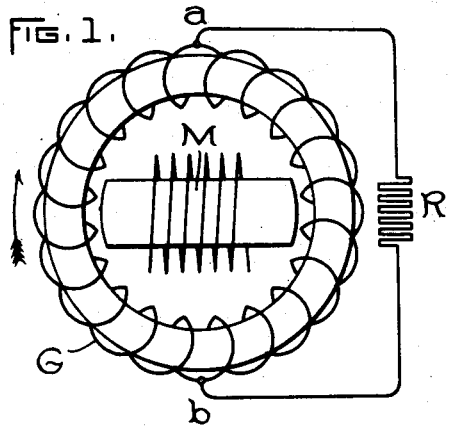
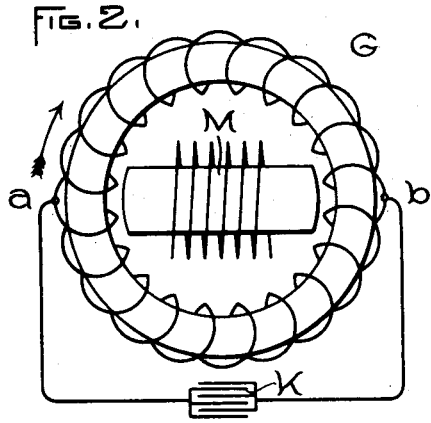
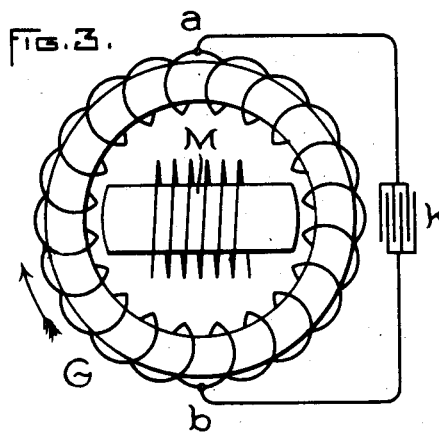
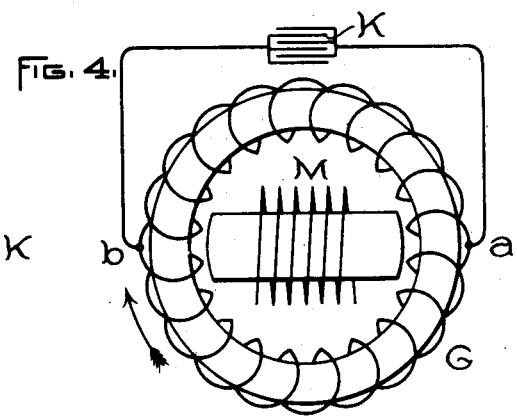
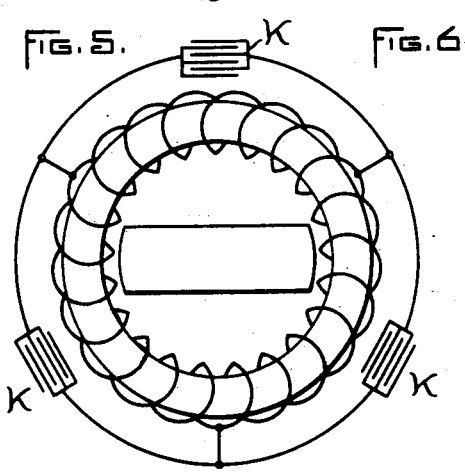
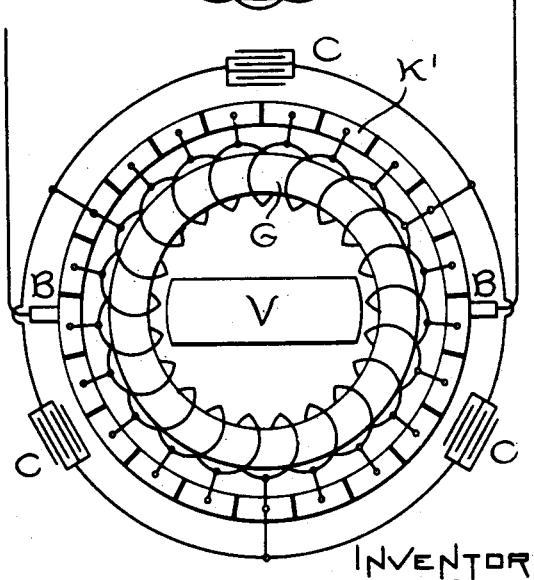
WITNESSES:
A. H. Abell.
A. F. Macdonald.
INVENTOR:
Harold W. Buck,
by Albert G. Davis
Atty.

No. 712,041. Patented Oct. 28, 1902.
H. W. BUCK.
EXCITING DYNAMO.
(Application filed Sept. 2, 1898.)
(No Model.) 2 Sheets—Sheet 2.

WITNESSES.
A. H. Abell.
Alexander S. Hunt.

INVENTOR.
Harold W. Buck,
by Albert G. Davis,
Atty.

UNITED STATES PATENT OFFICE.

HAROLD W. BUCK, OF SCHENECTADY, NEW YORK, ASSIGNOR TO THE GENERAL ELECTRIC COMPANY, A CORPORATION OF NEW YORK.

EXCITING-DYNAMO.

SPECIFICATION forming part of Letters Patent No. 712,041, dated October 28, 1902.

Application filed September 2, 1898. Serial No. 690,133. (No model.)

*To all whom it may concern:*

Be it known that I, HAROLD W. BUCK, a citizen of the United States, residing at Schenectady, county of Schenectady, State of New York, have invented certain new and useful Improvements in Exciting-Dynamos, (Case No. 673,) of which the following is a specification.

My invention relates to means for exciting the fields of direct-current dynamo-electric machines, and comprises a construction in which the usual field-magnet winding is entirely omitted and in which the excitation is due to artificially-produced leading currents in the coils of the armature or other winding movable relatively to the field-magnet.

In the drawings attached to this specification, Figures 1 to 5, inclusive, are illustrative diagrams. Fig. 6 represents diagrammatically an embodiment of my invention, and Fig. 7 a modification of the same.

Before proceeding to a description of my invention a few well-known principles will be reviewed in order to make clearer the explanation to follow.

In Fig. 1 let G represent a Gramme ring of the usual form, and M an internal field-magnet energized from some external source of direct current. Let the armature be tapped at diametrically opposite points $a\,b$, so as to form an alternating-current generator, and assume the armature to be rotated in the direction of the arrow, the current generated being fed to a non-inductive load R. With this arrangement the current will be approximately in phase with the impressed electromotive force, so that the maximum armature-current will flow at the same time that the armature electromotive force is a maximum. The relative position of armature and field corresponding to maximum armature electromotive force is shown in Fig. 1, in which the diameter $a\,b$ is at right angles to the field. In this position the armature and the field magnetomotive forces are at right angles to each other, so that there is no component of either magnetomotive force in the direction of the other. The armature-current will therefore neither magnetize nor demagnetize the field by its reaction thereon. The only effect is one of distortion. Suppose, however, that the generator feeds a load having capacity reactance—such as a condenser K, Fig. 2. In this case the current will not be in phase with the electromotive force producing it, but will lead by an angle equal approximately to ninety degrees or one-quarter of a period. In this case, therefore, the armature-current will reach its maximum one-quarter of a period earlier than if the load were non-reactive, as in Fig. 1, and the armature-terminals $a\,b$ will consequently occupy a position displaced or trailed backward ninety degrees when the maximum value of current occurs, as illustrated in Fig. 2. By making the armature-current leading it reaches its maximum earlier, and its magnetomotive force has a component in the same direction as the field-exciting magnetomotive force, and so assists the latter. As the armature rotates to the position shown in Fig. 3 the armature-current becomes zero, at which time there is no magnetizing reaction on the field. One-quarter of a revolution later, as shown in Fig. 4, the condenser-current again becomes a maximum and the field is reacted upon and magnetized in the same direction as in Fig. 2. Twice every revolution, therefore, the field will be magnetized by the reaction of the leading armature-current, thus producing a pulsating flux of a frequency depending on the rate of rotation of the armature. If, however, as shown in Fig. 5, the condensers be connected at regular intervals about the armature-winding, so as to be in multiphase relation thereto, there will be a practically constant reactive magnetization of the field by the leading condenser-currents in the armature. The external magnetization of the field may consequently be removed and the system will excite itself by the reaction of the wattless leading currents in the armature.

Having thus reviewed the principles underlying my invention, I will now proceed to a description of the same as embodied in a direct-current dynamo-electric machine.

In Fig. 6, G is a suitable armature. (Here shown as a Gramme ring.) At equal spaces about the armature connections are tapped off to a corresponding number of sources of leading electromotive force C C C. These may be either condensers, electrolytic cells, or overexcited synchronous motors. A commutator K' is connected to the armature in the usual way, with brushes B B bearing thereon. An unwound field-magnet V is in inductive relation to the armature and is here shown as internally arranged with respect to the same. As has been seen, the reaction of the leading currents flowing in the condensers will magnetize the field and the field thus established will generate a direct current, which may be taken from the commutator by the brushes B B, as in other direct-current machines. The leading currents will continue to flow in the armature independent of whatever load-current may be taken from the commutator. In a machine of the character described the field strength depends upon the current flowing into the condensers, so that the field strength, and consequently the voltage of the machine, may be varied by varying the condenser capacity in any suitable manner.

The mechanical construction of a machine such as described may undergo many modifications and its principle may be embodied in many different types of machines without departing from the spirit of my invention. Thus the field-magnets may be either internal, as shown in Fig. 6, and without windings thereon, or they may be external, with short projections forming the pole-pieces. In the latter case the poles are short and the magnetic circuits compact, because no necessity exists for providing space for winding field-coils.

In Fig. 7 of the drawings I have shown diagrammatically an arrangement of apparatus similar to that shown in Fig. 6, but comprising in addition means whereby the capacity or condenser effect may be conveniently varied, and thereby vary the direct-current electromotive force. Referring to Fig. 7, V represents an unwound field-magnet, either stationary or capable of rotation. In inductive relation thereto is a relatively rotatable armature G, having any suitable winding, which in the instance shown is of the Gramme type. This winding is tapped at intervals and connected to the segments of a commutator K' in a manner common to direct-current machines. Brushes B B bear on the commutator and serve to collect and transmit the current generated to the external circuit. The armature-winding is tapped at suitable intervals and connections led off through collector-rings or by other appropriate means to the primary of a transformer. In the case shown in the drawings the armature-winding is tapped at three equidistant points, so as to produce electromotive forces displaced in phase from each other by one hundred and twenty degrees. The transformer required is therefore of the three-phase type. Although in the form shown the transformer-windings, both primary and secondary, have a Y connection, it is obvious that the delta connection may be employed in either primary or secondary, or both, as may be desired. A condenser C is connected to the secondary of this transformer and is of the three-phase type, in which three sets of plates are connected, respectively, to the three-phase mains, while the remaining sets of plates are connected to a common point, or, what amounts to the same thing, in parallel. This condenser is connected with the secondary of the transformer by conductors connecting, respectively, with the switch-arms 7, 8, and 9, as shown. Each switch-arm cooperates with a plurality of contacts 11, in electrical connection with points in the winding of each leg of the transformer. By shifting the switch-arms from one set of contact-points to another the ratio of transformation of the tronsformer, and consequently its secondary voltage, is changed. By so doing the capacity effect in the primary due to the condenser in the secondary is varied in a manner well understood by engineers, thereby varying the volume of leading currents in the winding of the armature G. The field excitation varies in accordance with the variation of leading currents, and thus regulates and determines the desired current and voltage of the machine. The switch-arms 7, 8, and 9 may be operated independently, if desired; but I find it more convenient to connect them together by a connecting-rod 10, so as to secure a simultaneous movement of the same. The employment of a transformer in the manner described has several advantages. If the windings be such that the ratio of transformation is greater than one, or, in other words, if the secondary voltage be greater than the primary, I may employ a much smaller and less expensive condenser than would be required if the condenser were connected direct to the armature-winding, as shown in Fig. 5. By varying the ratio of transformation in the manner described the capacity effect may be varied more conveniently and through smaller gradations than could be easily attained merely by the use of a condenser the capacity of which is variable step by step in the usual way.

In general, the construction of a machine embodying my invention would be somewhat similar to that of a rotary converter, one side of the armature being connected to a commutator in the usual manner and the other side of the armature tapped at regular intervals and connected to collector-rings, which in turn are connected to condensers or other appropriate sources of leading electromotive force.

Although the invention, as illustrated in Figs. 6 and 7, is shown as applied to a bipolar Gramme-ring construction, it is obvious that it is equally applicable to machines of any number of poles and with any type of armature or armature-winding. Consequently I do not limit myself to the exact forms shown in the drawings, either as to the number of poles, styles of winding, or number of phases used on the condenser-circuit.

What I claim as new, and desire to secure by Letters Patent of the United States, is—

1. In a direct-current dynamo-electric machine, an unwound field-magnet, a winding in inductive relation to the field-magnet and means for passing leading currents through said winding.

2. A direct-current dynamo-electric machine having an armature and an unwound field-magnet, and means for advancing the phase of the currents in the armature-winding.

3. The combination of a direct-current dynamo-electric machine having a closed-coil armature, and means for causing leading currents to flow in the armature-winding.

4. The combination of a direct-current dynamo-electric machine, and means for exciting one member of the machine by wattless current flowing in the other.

5. The combination of a direct-current dynamo-electric machine, and condensers in multiphase relation to the armature-winding.

6. The combination in a dynamo-electric machine, of a field-magnet, a winding movable relatively to the field-magnet and means for acting on the winding by a plurality of leading electromotive forces in multiphase relation to each other.

7. The combination of a direct-current dynamo-electric machine, and means for acting upon the field-magnets of the machine by magnetomotive forces due to wattless currents.

8. The combination of a direct-current dynamo-electric machine having a closed-coil armature, and means for causing phase-displaced currents to flow in the armature-winding.

9. The combination of a direct-current dynamo-electric machine, an auxiliary alternating-current circuit having its terminals connected to the armature-winding and containing means for adjusting the phase relation between the current and the electromotive force in the armature circuit or circuits.

10. The combination of a direct-current dynamo-electric machine, a plurality of out-of-phase alternating-current circuits suitably connected to the armature-winding and containing means for adjusting the phase relation between current and electromotive force in the armature circuit or circuits.

11. The combination of a direct-current dynamo-electric machine, a plurality of auxiliary circuits the terminals of which are so connected to the armature-winding as to receive out-of-phase currents therefrom, and means included in said circuits for adjusting the phase relation between current and electromotive force in the armature circuit or circuits.

In testimony whereof I have hereunto set my hand this 31st day of August, 1898.

HAROLD W. BUCK.

Witnesses:
A. F. MACDONALD,
A. H. ABELL.